United States Patent [19]

Sincerbox et al.

[11] Patent Number: 4,585,315

[45] Date of Patent: Apr. 29, 1986

[54] BRIGHTFIELD/DARKFIELD MICROSCOPE ILLUMINATOR

[75] Inventors: Glenn T. Sincerbox, San Jose; Harald W. Werlich, Los Gatos; Bwo-Han Yung, San Jose, all of Calif.

[73] Assignee: International Business Machines Corporation, Armonk, N.Y.

[21] Appl. No.: 670,096

[22] Filed: Nov. 13, 1984

[51] Int. Cl.$^4$ .......................... G02B 21/06; G02B 5/08
[52] U.S. Cl. ..................................... 350/525; 350/622; 350/623
[58] Field of Search ............................... 350/523–529, 350/618, 622, 623, 626

[56] References Cited

U.S. PATENT DOCUMENTS

| | | | |
|---|---|---|---|
| 1,943,509 | 1/1934 | Bauersfeld | 350/525 |
| 1,943,510 | 1/1934 | Bauersfeld et al. | 350/525 |
| 1,988,946 | 1/1935 | Hauser et al. | 350/525 |
| 2,097,494 | 11/1937 | Lihotzky | 350/525 |
| 3,752,560 | 8/1973 | Lunn | 350/525 |
| 4,317,613 | 3/1982 | Grosser | 350/525 |

FOREIGN PATENT DOCUMENTS

| | | | |
|---|---|---|---|
| 493519 | 3/1930 | Fed. Rep. of Germany | 350/525 |
| 569884 | 2/1933 | Fed. Rep. of Germany | 350/526 |
| 50209 | 4/1980 | Japan | 350/618 |

OTHER PUBLICATIONS

Hooff et al, "Description of a Dark-Field Illuminator Cone for the Dissecting Microscope", Microscopica Acta, 9–1981, pp. 17–18.

Updyke, B. V. "A Method of Dark-Field & Simultaneous Light-Dark-Field Illumination for Photomacrography of Autoradiographic Preparations", Jr. of Neuroscience Methods, 5–1982, pp. 327–341.

Primary Examiner—William H. Punter
Attorney, Agent, or Firm—Joseph E. Kieninger; Peter R. Leal

[57] ABSTRACT

A brightfield/darkfield microscope illuminator has two axicon mirrors and a third plane mirror for use with two light beams from different sources. An open shutter positioned in the path of one beam provides brightfield illumination. An open shutter positioned in the path of the other beam provides darkfield illumination. This illuminator easily switches between operation in the darkfield and brightfield modes, uses substantially all the light in one beam for darkfield illumination and easily balances the illumination between the two light sources.

7 Claims, 3 Drawing Figures

BRIGHTFIELD/DARKFIELD MICROSCOPE ILLUMINATOR

DESCRIPTION

TECHNICAL FIELD

This invention relates to microscope illuminators and more particularly to a highly efficient and easily switchable brightfield/darkfield illuminator.

BACKGROUND ART

The patents to Bauersfeld, U.S. Pat. No. 1,943,509 and Bauersfeld et al., U.S. Pat. No. 1,943,510, disclose conventional vertical illumination systems which may be used for either brightfield or darkfield microscope. The same illumination axis is used for both brightfield and darkfield microscope although different portions of the path are utilized for different types of microscope. These illuminators do not employ axicons, i.e. a reflective conical surface, mirrors.

The patent to Hauser et al., U.S. Pat. No. 1,988,946 discloses an illumination system that employs two axicon mirrors, but it does not have a third mirror and it does not provide 100% of the available light for darkfield illumination. It is not easy with this system to switch efficiently or to balance light sources.

The patent to Grosser, U.S. Pat. No. 4,317,613, describes an illumination system that uses different torroidal reflecting surfaces always in combination with a transparent, conical device (axicon) which functions as a refracting optical element for low numerical aperture (NA) beams, and as a total internal reflecting *TIR) element for high NA beams. When simultaneously several modes of operation are provided, the illuminating beam is divided into several components, resulting in reduced power in each branch. Rapid switching between modes of operation cannot be accomplished at high rates (i.e. video rates) or under microprocessor control, but requires operator intervention for re-positioning components and adjustments.

The systems described above work sufficiently well for use by a skilled operator. The application of these methods to visual automated inspection tasks is limited due to several problems. One problem is that the switchover from one mode, for example, incident brightfield, to the other mode, incident darkfield requires human intervention which is not practical in computer controlled systems. Another problem is that the present systems present a highly magnified image to the human eye which has a relatively low resolution capability (10 lines/mm). In addition, the present systems make little effort to maintain constant light levels for different modes of observation because of the eyes immense dynamic range which is believed to extend over 12 to 15 decades. However, light detection systems, such as the vidicon tube or CCD array camera used in automated microscopes may have 5 to 10 times the resolution, but have a dynamic range of only three decades. As a result, in automated systems the light levels should be independently adjustable for efficient use in both the brightfield and darkfield observation modes. In fact, significantly more light is required for darkfield illumination because only scattered light is collected and directed to the photodetection system. Since present darkfield illumination systems are substrative, they typically use only 50 to 80% of the available light and significant differences occur between brightfield and darkfield illumination levels.

SUMMARY OF THE INVENTION

It is a primary object of this invention to provide an improved brightfield/darkfield microscope illuminator.

It is another object of this invention to provide a brightfield/darkfield microscope illuminator that uses substantially 100% of the light from a beam for microscope illumination in the darkfield operation mode.

It is still another object of the invention to provide a brightfield/darkfield microscope illuminator that can be easily switched from one operating mode to the other operating mode.

It is yet still another object to provide a brightfield/darkfield microscope illuminator that can readily provide substantially the same intensity of light to a photodetector for an object being examined in both the darkfield and brightfield operating modes.

These and other objects are accomplished by a brightfield/darkfield illuminator which has two axicon mirrors and a third plane mirror and which is used with two light beams. The first axicon mirror reflects the first beam rays into a direction perpendicular to the original direction of the rays. The second axicon mirror has a hole therein and is positioned concentrically about the first axicon mirror to reflect the rays from the first axicon mirror in a direction perpendicular to their direction with the reflected rays being distributed in an annular shape. A third plane mirror having a transparent elliptical aperture therein is positioned at an angle of about 45° to the first beam so that light from the first beam passes through the aperture while light reflected from the second mirror is reflected at right angles by this third plane mirror. The second light beam, incident on the third plane mirror at right angles to the first light beam, passes through the elliptical aperture to provide brightfield illumination. A shutter is positioned in each beam so that when one shutter is open darkfield illumination is provided, while when the second shutter is open brightfield illumination is obtained.

Other objects of this invention will be apparent from the following detailed description, reference being made to the following drawings in which a specific embodiment of the invention is shown.

DESCRIPTION OF THE PREFERRED EMBODIMENT

Figure 1B:
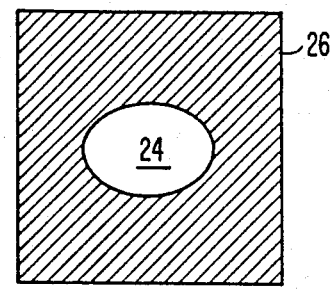
FIG. 1B is a top view of plane mirror 26 of FIG. 1.
Figure 1:
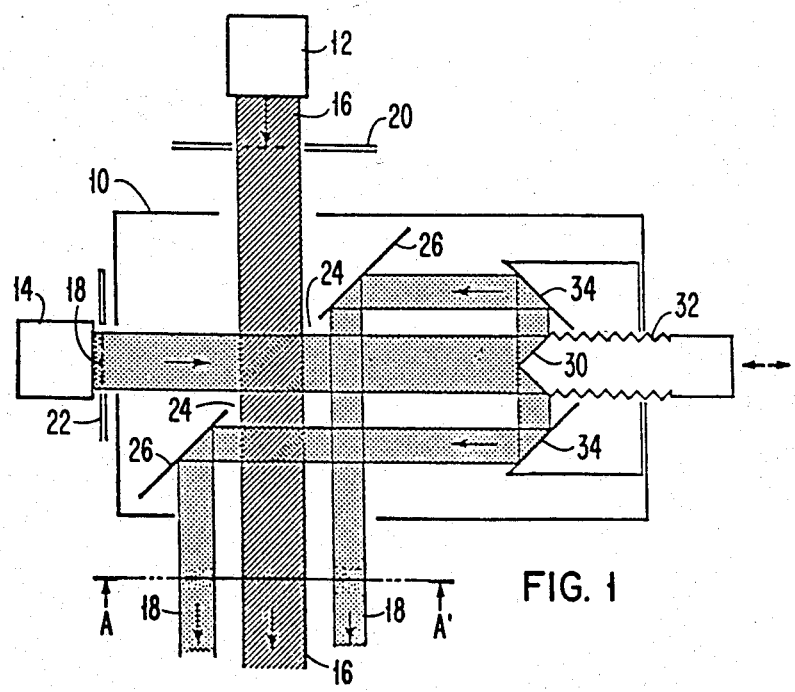
FIG. 1 is a schematic view of a preferred embodiment in accordance with this invention.

In a preferred embodiment of this invention a brightfield/darkfield microscope illuminator 10 is shown in FIG. 1. This illuminator 10 uses two light sources 12 and 14 that provide beams 16 and 18 respectively which are perpendicular to each other. Beams 16 and 18 pass through shutters 20 and 22 respectively and through a transparent opening 24 in mirror 26. The mirror 26 and transparent opening 24 are shown more clearly in FIG. 1B. The mirror 26 is mounted in illuminator 10 at an angle of 45° as shown. The opening 24 has an elliptical shape with eccentricity $e=2$.

Figure 1A:
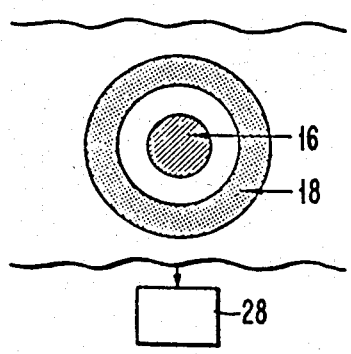
FIG. 1A is a cross-sectional view of the illumination pattern along the line A—A'.

The beam 16 passes through an open shutter 20 and through opening 24 in mirror 26 to provide the brightfield illumination for microscope 28. FIG. 1A illustrates the brightfield illumination provided by beam 16 as well as the darkfield illumination provided by beam 18.

The beam 18 passes through an open shutter 22 and through opening 24 in mirror 26 to axicon mirror 30. Axicon mirror 30 has screw means 32 for adjusting the position of mirror 30 along its axis to control the size of the annual shape of reflected beam 18. The beam 18 is reflected in a direction perpendicular to its original direction to a fixed axicon mirror 34 concentric with axicon mirror 30. The beam 18 is reflected by axicon mirror 34 to a direction parallel to its original direction to mirror 26 which reflects the annular light distribution in beam 18 in a direction parallel to beam 16 to provide the darkfield illumination for microscope 28.

In this embodiment either darkfield or brightfield illumination can be selected rapidly by opening and closing the appropriate shutters. Simultaneous brightfield/darkfield illumination can be obtained by opening both shutters 20 and 22.

Although preferred embodiments have been described, it is understood that numerous variations may be made in accordance with the principles of this invention.

We claim:

1. A microscope illuminator for object illumination with a first light beam for brightfield illumination and a second light beam for darkfield illumination comprising housing means having openings therein for said light beams,
    a first axicon mirror associated with said housing means and positioned to accept said darkfield beam and to reflect each ray of said second beam into a direction perpendicular to the original direction of said beam,
    a second axicon mirror having a hole therein and positioned concentrically about said first mirror to reflect the rays from said first mirror into a direction perpendicular to their direction and with said reflected rays being distributed in an annular shape, and
    a third miror having a transparent elliptical aperture therein positioned at an angle of 45° to said darkfield beam wherein light from said second beam passes through said aperture to said first mirror and light reflected from said second mirror is reflected by said third mirror to provide darkfield illumination on said object and wherein light from said first beam passes through aperture to provide brightfield illumination on said object.

2. An illuminator as described in claim 1 including means for adjusting said first mirror along its axis relative to said second mirror to control the size of said annular shape.

3. An illuminator as described in claim 2 wherein said means for adjusting said first mirror are screw means.

4. A microscope illuminator system for object illumination comprising
    a first light source providing a darkfield illumination beam,
    a second light source providing a brightfield illumination beam,
    housing means having openings therein for said darkfield and brightfield beams,
    a first axicon mirror associated with said housing means and positioned to accept and reflect each ray of said darkfield beam into a direction perpendicular to the original direction of said beam,
    a second axicon mirror having a hole therein and positioned concentrically about said first mirror to reflect rays from said first mirror into a direction perpendicular to their direction and with said reflected rays being distributed in an annular shape,
    means for adjusting the position of said first mirror along is axis relative to said second mirror to control the size of said annular shape, and
    a third mirror having a transparent elliptical aperture therein positioned at an angle of 45° to said darkfield beam wherein light from said darkfield beam passes through said aperture to said first mirror and light reflected from said second mirror is reflected by said third mirror to provide darkfield illumination on said object and wherein light from said brightfield beam passes through aperture to provide brightfield illumination on said object, said brightfield beam being colinear with said reflected light when illuminating said object.

5. A system as described in claim 4 including a first shutter positioned in said darkfield illumination beam to provide darkfield illumination when said first shutter is open.

6. A system described in claim 4 including a second shutter positioned in said brightfield illumination beam to provide brightfield illumination when said second shutter is open.

7. A system as described in claim 4 including means to adjust said second light source to provide an illumination level on said object that is substantially the same as the illumination from said first source.

* * * * *